United States Patent [19]

Cayless et al.

[11] 4,419,137

[45] Dec. 6, 1983

[54] CORROSION INHIBITORS, METHOD OF PRODUCING AND PROTECTIVE COATINGS CONTAINING SAME

[75] Inventors: Richard A. Cayless, London; David A. Pippard, Hampton Hill, both of England

[73] Assignee: The British Petroleum Company Limited, London, England

[21] Appl. No.: 287,635

[22] Filed: Jul. 28, 1981

[30] Foreign Application Priority Data

Aug. 9, 1980 [GB] United Kingdom ............... 8026031

[51] Int. Cl.$^3$ ............................................. C09D 5/08
[52] U.S. Cl. ............................. 106/14.39; 106/14.44; 106/292; 106/297; 106/306; 524/428; 524/434; 524/435; 524/436
[58] Field of Search ............... 106/14.05, 14.39, 14.44, 106/292, 297, 306; 524/428, 434, 435, 436

[56] References Cited

U.S. PATENT DOCUMENTS 2,913,419 11/1959 Alexander ..................... 106/15.05
3,899,624 8/1975 Sutherland ..................... 428/327

FOREIGN PATENT DOCUMENTS 1503153 3/1978 United Kingdom .

Primary Examiner—Lorenzo B. Hayes
Attorney, Agent, or Firm—Morgan, Finnegan, Pine, Foley and Lee

[57] ABSTRACT

Corrosion inhibiting particles comprise an inorganic oxide which is silica or alumina, having corrosion inhibiting cations, particularly calcium or zinc cations, chemically bound to the particles. They may be prepared by contacting a silica or alumina containing hydroxyl groups with an alkaline solution containing the cations, at ambient temperature.

The corrosion inhibiting particles may be incorporated into protective coatings, e.g. paints based on epoxy resins, alkyd resins, vinyl resins or chlorinated rubbers, in amounts up to 80% wt based on dry film weight, giving coatings with up to 7.2% wt corrosion inhibiting cations.

Release of the cations is by ion exchange with other cations, e.g. the alkali metal cations of sea water, and does not, as is normal with corrosion inhibiting coatings, depend on the water solubility of the corrosion inhibitor.

15 Claims, No Drawings

CORROSION INHIBITORS, METHOD OF PRODUCING AND PROTECTIVE COATINGS CONTAINING SAME

This invention relates to corrosion inhibitors suitable for incorporation into protective coatings, e.g. paints, to methods of producing the corrosion inhibitors and to coatings containing them.

It is known that certain cations, e.g. calcium and zinc cations, have corrosion inhibiting properties and that compounds containing them can be included in protective coatings. The compounds are usually in the form of sparingly water-soluble salts. The coatings themselves have a limited permeability to water and it is believed that the mechanism of corrosion inhibition involves the gradual dissolving of the compounds in water releasing the cations as the active inhibitors. For such systems to be effective over a long period the solubility of the compound is particularly important. If the compound is too soluble, blistering of the coating may occur and the compound will be rapidly depleted; if it is insufficiently soluble the compound will be ineffective.

The present invention is concerned with corrosion inhibitors which depend for their effectiveness on ion exchange rather than solubility.

According to the present invention, a corrosion inhibitor comprises particles of an inorganic oxide which is silica or alumina having corrosion inhibiting cations chemically bound to the particles.

The preferred cations are calcium ($Ca^{2+}$) or zinc ($Zn^{2+}$) cations but other suitable cations may be cobalt ($Co^{2+}$), lead ($Pb^{2+}$), strontium ($Sr^{2+}$), lithium ($Li^+$), barium ($Ba^{2+}$) and magnesium ($Mg^{2+}$).

As is well known, particles of silica, alumina and other oxides may be prepared which have a proportion of hydoxyl groups on their surface, e.g. the so-called activated aluminas of commerce used, inter alia, as packing for chromatographic columns and silica used for drying.

It has been found that the protons of the hydroxyl groups can be replaced by contacting the oxide (silica or alumina) with a solution containing the required cations. To carry out exchange the oxide (silica or alumina) may be stirred in water at room temperature and the pH monitored by a meter. Then the substance to be exchanged (e.g. calcium hydroxide or basic zinc carbonate) is added slowly whilst not allowing the pH to rise above 10.5 for silica or 12 for alumina. Preferably a solution of a highly soluble salt (e.g. nitrate) of the cation is used to provide a high concentration of the cations which suppresses the rapid dissolution of the substance to be exchanged (e.g. calcium hydroxide or basic zinc carbonate) in order to control the rate of rise of the pH. The pH needs to be high enough to remove protons but not so high as to dissolve the inorganic oxide. The uptake can be followed by observing the fall of pH over a period of time following the addition of the base. When the pH no longer falls then exchange is complete and the silica or alumina can be milled, if necessary, washed and dried under vacuum. Uptake of cations in the oxide can be measured by XRF spectroscopy.

Preferably the silica or alumina has a BET surface area greater than 250 $m^2/g$ and more preferably greater than 500 $m^2/g$. As indicated subsequently the particles should be of relatively small size when incorporated into protective coatings, but it has been found that larger size particles can be ion-exchanged and then subsequently milled to a smaller size without adverse effect. The larger particle size does not reduce the uptake of ions and the subsequent milling does not destroy the chemical bond.

Suitable silicas are as follows:

| | BSS Mesh Size | BET Surface Area ($m^2/g$) | Typical Cation Uptake (millimoles/g) |
|---|---|---|---|
| Silica Gel (ex BDH) | 60–120 | 500 | 1.3–2.5 |
| Cecagel (ex British Ceca Company Limited) | 8–16 | 692 | 0.7–2.4 |
| Gasil 200 (ex Joseph Crosfield) | — | 719 | 1.3 |
| Sorbsil 'A' (ex Joseph Crosfield) | 60–120 | 578 | 0.7 |

A suitable alumina is Alcoa F1 supplied by (Alcoa of GB Ltd).

Depending on the proportion of hydroxyl groups on the inorganic oxide it has been found that up to 2.5 millimoles/g of cation can be combined with the oxide. Since, as indicated above, the technique of ion-exchange is relatively simple the selection of preferred inorganic oxides and the treatments to give maximum uptake of corrosion inhibiting cations can be determined by simple comparative experiments. The preferred lower limit is 0.2 millimoles/g.

The corrosion inhibiting particles may be included in protective coatings and the present invention includes protective coatings containing corrosion inhibiting particles as described above. The protective coatings may be any of the known types of protective coatings based on film forming polymers of resins, e.g. paints, varnishes and lacquers. It may, in particular, be primer paints based on epoxy resins, vinyl resins, alkyd resins, chlorinated rubbers or cyclised rubbers.

The corrosion inhibiting particles may act as a filler for the coating and may be included in relatively large amounts of up to 40% wt, based on the composition to be applied and up to 80% wt based on the dry film weight.

Having regard to the quantity of cations which can be combined with the oxide as discussed previously it will be seen that the coatings may contain up to 2 millimoles/g of corrosion inhibiting cations based on the dry film weight.

Preferably the quantity of corrosion inhibiting cations is at the upper end of the range, preferred amounts of particles being 30–80% wt based on the dry film weight.

When used in protective coatings the particles should be suitably small so as to remain in suspension in the composition before application and so as not to substantially affect the ease of application or the smoothness of the dry coating. Suitable particle sizes may be up to 40 micron diameter.

The corrosion inhibiting particles act to release the cations into solution by ion exchange with an ion which exists in the environment in which the particles are used. Thus the invention is particularly useful for protecting structures in or above the sea, the sea providing alkali metal cations for exchange with the corrosion inhibiting cations. The structure will normally be metal structures and the corrosion inhibiting particles will normally be in a protective coating. Unlike present paints which act by the solubilisation of corrosion inhibiting salts, it is the permeability to the exchanging ions rather than the permeability of water which controls the rate of release of the corrosion inhibiting ions. Thus the corrosion inhibiting ions will be preferentially released from the inorganic oxide in those areas where the desired barrier properties of the coating are weakest.

Particular structures which may be protected are the hulls and superstructures of ships, and rigs and platforms used for oil or gas exploration or production.

The invention may, however, have application for protecting structures on land where potentially corrosive ions may be present in the atmosphere, e.g. structures subject to atmospheres with relatively high concentrations of alkaline components, e.g. $NH_3$.

The invention is illustrated by the following examples.

EXAMPLES 1-4

A series of pigments were made containing silica exchanged with various amounts of calcium hydroxide.

| | |
|---|---|
| 1 | 100 g silica 0 g Ca(OH)$_2$ |
| 2 | 100 g silica 5 g Ca(OH)$_2$ |
| 3 | 100 g silica 10 g Ca(OH)$_2$ |
| 4 | 100 g silica 15 g Ca(OH)$_2$ |

The exchange was carried out by stirring granules of silica gel in water at room temperature. The required weight of calcium hydroxide was added slowly and the pH monitored so that the addition rate was such that the pH did not rise above 9. The silica was B.D.H. silica gel. The product was washed, milled to a particle size less than 20 micron in water, dried and incorporated in a 50:50 mixture by volume with titanium dioxide pigment in a series of alkyd paints based on Synolac 76W resin (Cray Valley Products Limited) at 38% pigment volume concentration. These paints were applied to steel panels previously cleaned in an ultrasonic bath and exposed to British Standard (BS 3900:F2) Humidity Test (10 days 100% humidity cycling between 42° and 48° C.). The results were marked on a scale of 0 to 5 for corrosion where 5 is a bad result and 0 means no visible corrosion. The paint based on

| | |
|---|---|
| 1 above scored | 5 |
| 2 above scored | 1 |
| 3 above scored | 0 |
| and 4 above scored | 0 | thus showing the anti-corrosive action of the calcium-exchanged silica.

EXAMPLE 5

CALCIUM EXCHANGED SILICA

An approximately one molar solution of calcium nitrate was prepared by dissolving 118 g of Ca(NO$_3$)$_2$·4H$_2$O in 500 cm$^3$ of distilled water. 80 g of silica sold by British Ceca Company Limited under the Trade Name "Cecagel" were added to this solution whilst stirring vigorously. Calcium hydroxide was then slowly added such that the pH did not rise above 9.5. Once the pH was stable at 9.0±0.05 for more than 5 minutes no further calcium hydroxide was added. The total weight of calcuim hydroxide added was 16 g.

The calcium exchanged silica was then filtered, washed, milled in water to a particle size less than 35 microns and dried. X-ray fluorescence analysis of the product indicated a calcium content of 8.7% by weight.

EXAMPLE 6

STRONTIUM EXCHANGED SILICA

An approximately one molar solution of strontium nitrate was made by dissolving 53 g of Sr(NO$_3$)$_2$ in 250 cm$^3$ of distilled water. To this was added 75 g of "Cecagel" silica (ex British Ceca Company Limited) whilst vigorously stirring. Strontium hydroxide was then slowly added such that the pH did not rise above 9.0-9.5. Once the pH was stable at pH 9.0±0.05 for more than 5 minutes, no further strontium hydroxide was added. The total weight of Sr(OH)$_2$·8H$_2$O added was 21 g.

The strontium exchanged silica gel was then filtered, washed, milled in water to a particle size less than 35 microns and dried. X-ray fluorescence analysis of the product showed a strontium content of 6% by weight.

EXAMPLE 7

BARIUM EXCHANGED SILICA

An approximately molar solution of barium nitrate was made by dissolving 65.3 g of Ba(NO$_3$)$_2$ in 250 cm$^3$ of distilled water. To this was added 75 g of "Cecagel" silica (ex-British Ceca Company Limited) whilst vigorously stirring. Barium hydroxide was then slowly added such that the pH did not rise above 9.0-9.5. Once the pH was stable at pH 9.0±0.05 for more than 5 minutes no further barium hydroxide was added. The total weight of Ba(OH)$_2$·8H$_2$O added was 18 g.

The barium exchanged silica gel was then filtered, washed, milled in water to a particle size less than 35 microns and dried. X-ray fluorescence analysis of the product showed a barium content of 14% by weight.

EXAMPLE 8

MAGNESIUM EXCHANGED SILICA

An approximately molar solution of magnesium nitrate was made by dissolving 46.1 g of Mg(NO$_3$)$_2$ in 250 cm$^3$ of distilled water. To this was added 50 g of "Cecagel" silica (ex British Ceca Company Limited) whilst vigorously stirring. Magnesium hydroxide was then slowly added such that the pH did not rise above 8.5-9.0. Once the pH was stable at 8.5±0.05 for more than 5 minutes no further magnesium hydroxide was added. The total weight of Mg(OH)$_2$ added was 8.8 g.

The magnesium exchanged silica gel was then filtered and washed. A coarse sieve was used to allow the undissolved Mg(OH)$_2$ to pass through. The silica gel was then milled in water to a particle size less than 35 microns and dried. X-ray fluorescence analysis of the product showed a magnesium content of 2% by weight.

EXAMPLE 9

LITHIUM EXCHANGED SILICA

An approximately molar solution of lithium nitrate was made by dissolving 31 g of LiNO$_3$·3H$_2$O in 250 cm$^3$ distilled water. To this was added 75 g of "Cecagel" silica (ex British Ceca Company Limited) whilst vigorously stirring. Lithium hydroxide was then slowly added such that the pH did not rise above 9.5-10.5. Once the pH was stable at pH 10±0.05 for more than 5 minutes no further lithium hydroxide was added. The total weight of LiOH·H$_2$O added was 6 g.

The lithium exchanged silica gel was then filtered, washed, milled in water to a particle size less than 35 microns and dried. Atomic absorption spectroscopic analysis of the product showed a lithium content of 1.3% by weight.

EXAMPLE 10
CALCIUM EXCHANGED SILICA

An approximately molar solution of calcium nitrate was prepared by dissolving 118 g of Ca(NO$_3$)$_2$·4H$_2$O in 500 cm$^3$ of distilled water. To this was added 200 g of "Sorbsil" "A" grade silica gel (ex Joseph Crosfield) 60–120 mesh whilst stirring vigorously. Calcium hydroxide was then slowly added such that the pH did not rise above 9.0–9.5. Once the pH was stable at pH 9.0±0.05 for more than 5 minutes no further calcium hydroxide was added. The total weight of calcium hydroxide added was 20.5 g.

The exchanged silica gel was then filtered, washed, milled in water to a particle size less than 35 microns and dried. X-ray fluorescence analysis of the product showed a calcium content of 2.4% by weight.

EXAMPLE 11
CALCIUM EXCHANGED SILICA

An approximately molar solution of calcium nitrate was prepared by dissolving 118 g of Ca(NO$_3$)$_2$·4H$_2$O in 500 cm$^3$ of distilled water. To this was added 200 g of "Gasil 200" silica (ex Joseph Crosfield) whilst stirring vigorously. Calcium hydroxide was then slowly added such that the pH did not rise above 8.5–9.0. Once the pH was stable at 8.5±0.05 for more than 5 minutes no further calcium hydroxide was added. The total weight of Ca(OH)$_2$ added was 16 g.

The exchanged silica gel was then filtered, washed, milled in water to a particle size less than 35 microns and dried. X-ray fluorescence analysis of the product showed a calcium content of 4.3% by weight.

EXAMPLE 12
CALCIUM EXCHANGED ALUMINA 100 g of Alcoa F1 alumina (ex Alcoa of GB Ltd) was vigorously stirred in 400 cm$^3$ of distilled water. The pH was approximately 10. Calcium hydroxide was then slowly added such that the pH did not rise above 12. Once the pH was stable at 12±0.05 for one hour no further calcium hydroxide was added.

Calcium nitrate was not used because control of the rate of rise of the pH is not as critical for alumina as it is for silica.

The exchanged alumina was filtered and washed. A coarse sieve was used to allow the undissolved Ca(OH)$_2$ to pass through. The alumina was then milled in water to a particle size of less than 30 microns and dried. The X-ray fluorescence analysis of the product showed a calcium content of 1.44% by weight.

EXAMPLE 13
ANTI-CORROSION PROPERTIES OF CATION EXCHANGED SILICA

The cation-exchanged silicas prepared in Examples 5 to 9 were tested to assess their corrosion inhibiting properties. Pre-weighed, grit blasted steel panels were placed in 3½% by weight sodium chloride solutions containing 10 g of the cation exchanged silica per 100 mls of the salt solution. The solutions were agitated and aerated by sparging air through the mixtures for 7 days. The panels were then removed from the solutions derusted with ammoniacal acetyl acetonate, washed, dried and re-weighed. The loss in weight of a panel is a direct measurement of the anti-corrosive properties of the cation exchanged silicas. The results are shown in Table 1 and are expressed as % loss in weight relative to the loss in weight of a panel immersed in the salt solution with no corrosion inhibitor present. The results indicated that the corrosion inhibitors reduce the amount of corrosion by more than half.

TABLE 1

Anti-corrosive properties of cation exchanged silicas

| Cation Exchanged Silica | % loss in weight relative to loss in weight of control |
|---|---|
| Calcium exchanged silica (Example 5) | 32 |
| Strontium exchanged silica (Example 6) | 48 |
| Barium exchanged silica (Example 7) | 15 |
| Magnesium exchanged silica (Example 8) | 46 |
| Lithium exchanged silica (Example 9) | 43 |

EXAMPLE 14
PAINT FORMULATIONS INCORPORATING CATION EXCHANGED SILICA

A series of paints were prepared containing calcium exchanged silica, as prepared in Examples 5, 10 and 11, as a corrosion inhibitor. The composition of the paints are given in Table 2. Metal driers and anti-skinning agents were also included in formulations 1 to 3 in the amounts recommended by the manufacturers. The pigment volume concentration for each formulation is also given in Table 2.

The components for formulations 1 and 4 were mixed together and fully blended in a "mini motormill", supplied by Eiger Engineering, for 5 minutes. The components of formulations 2 and 3 were mixed together and fully blended in a ball mill for 24 hours.

Known thicknesses of the paint formulations were applied to degreased, polished mild steel panels (ex Pyrene Chemical Services Limited and cured for 7 days at room temperature. The coated panels were then scratched through to the bare metal and subjected to the ASTM B117-73 salt spray test and rusting evaluated according to ASTM 610-68. The results are given in Table 3 along with the results for an alkyd paint containing no cation exchanged silica.

The rusting evaluation test ASTM 610-68 is a visual test of the specimens in which values are assigned on a scale of 0 to 10 where 10 is a good result and 0 is a bad result. Thus each of the formulations containing calcium exchanged silica as a corrosion inhibitor performed better than the alkyd paint containing no corrosion inhibitor.

Formulation 1 was also supplied as a 75 μm coating to a ¼ inch grit blasted steel plate and exposed for 9 months at a coastal site. At the end of this period the coating showed no signs of deterioration and was visibly better than commercial zinc phosphate and zinc chromate anti-corrosion primers which were tested along with formulation 1.

TABLE 2

PAINT FORMULATIONS INCORPORATING CATION EXCHANGED SILICA

| Component | | Formulations | | | |
|---|---|---|---|---|---|
| | | 1 | 2 | 3 | 4 |
| Long oil alkyd (Synolac 76W ex Cray Valley Products Ltd) | (g) | 100 | 100 | 100 | |
| 60% Solution Epikote 1001 in epoxy thinners (ex Shell Chemicals) | (g) | | | | 100 |
| Soya lecithin (ex BOCM Silcock) | (g) | 0.5 | 0.5 | 0.5 | |
| Calcium exchanged silica | (g) | | | | |
| (Example 5) | | 45 | | | |
| (Example 10) | | | 45 | | 38 |
| (Example 11) | | | | 45 | |
| Microdol extra (ex Norwegian Talc) | (g) | 40 | 45 | 45 | 50 |
| Iron oxide | (g) | 25 | | | |
| Titanium dioxide (RCR2 ex BTP Tioxide) | (g) | | 28 | 28 | 19 |
| White Spirit | (g) | 15 | 15 | 15 | |
| Epoxy thinner | (g) | | | | 10 |
| 60% Solution of curing agent in epoxy thinner (Versamid 115 ex Cray Valley (Products Ltd) | (g) | | | | 50 |
| Pigment volume concentration | (%) | 45 | 45 | 45 | 35 |

TABLE 3

RESULTS OF SALT ASTM B117-73 SPRAY TEST ON PAINT COATINGS CONTAINING CATION EXCHANGE SILICAS

| | | ASTM B117-73 Salt Spray Test ASTM D610-68 Rusting Evaluation | | |
|---|---|---|---|---|
| Formulation | Coating Thickness (μm) | Without Blistering | With Blistering | % Rusted |
| 1 | 70 | 10 | 9 | 9 |
| 2 | 100 | 10 | 8 | 8 |
| 3 | 120 | 10 | 8 | 8 |
| 4 | 75 | 10 | 9 | 9 |
| Alkyd paint containing no cation exchanged silica | 90 | 7 | 4 | 2 |

We claim:

1. A corrosion inhibitor comprising particles of an inorganic oxide selected from the group consisting of silica and alumina, having corrosion inhibiting metal cations chemically bound to the surface of the particles by ion exchange with protons from hydroxyl groups on said surface, whereby said cations bound to said particles can only be released by further ion exchange.

2. A corrosion inhibitor as claimed in claim 1 characterised in that the corrosion inhibiting cations are selected from the group consisting of calcium, zinc, cobalt, lead, strontium, lithium, barium and magnesium cations.

3. A corrosion inhibitor as claimed in either of claims 1 or 2 characterised in that the silica or alumina has a BET surface area greater than 250 m²/g.

4. A corrosion inhibitor as claimed in claim 3 characterised in that the silica or alumina has a BET surface area greater than 500 m²/g.

5. A corrosion inhibitor as claimed in claim 1 characterised in that the inorganic oxide contains from 0.2 to 2.5 millimoles/g of cations.

6. A corrosion inhibitor as claimed in claim 1 characterised in that the particles are up to 40 microns in diameter.

7. A method of forming corrosion inhibiting particles which particles comprise silica particles having corrosion inhibiting cations chemically bound to the surface of the particles by ion exchange, comprises contacting at ambient temperature silica particles with an alkaline solution containing corrosion inhibiting cations, the pH of the alkaline solution being sufficiently high to remove protons from hydroxyl groups effecting said exchange at the surface of the particles while not allowing the pH to rise about 10.5.

8. A method of forming corrosion inhibiting particles which particles comprise alumina particles having corrosion inhibiting cations chemically bound to the surface of the particles by ion exchange comprises contacting at ambient temperature alumina particles with an alkaline solution containing corrosion inhibiting cations, the pH of the alkaline solution being sufficiently high to remove protons from hydroxyl groups effecting said exchange at the surface of the particles while not allowing the pH to rise above 12.

9. A method as claimed in claim 7 or 8 characterised in that the inorganic oxide is contacted with an alkaline solution containing corrosion inhibiting cations in the presence of a solution of a highly soluble salt of the cation.

10. A method as claimed in claim 9 characterised in that the soluble salt is a nitrate.

11. A protective coating containing a film-forming resinous vehicle and corrosion inhibiting particles as claimed in claim 1.

12. A protective coating as claimed in claim 11 characterised in that the coating contains up to 80% wt of corrosion inhibiting particles based on the dry weight of the film.

13. A protective coating as claimed in claim 12 characterised in that the coating contains from 30 to 80% wt of corrosion inhibiting particles based on the dry weight of the film.

14. A protective coating as claimed in claim 11 characterised in that the coating is a paint based on epoxy resin, vinyl resin, alkyd resin, chlorinated rubber or cyclised rubber.

15. A protective coating containing a film forming resinous vehicle and corrosion inhibiting particles as prepared according to either claim 7 or claim 8.

* * * * *